US012522391B2

(12) United States Patent
Bradshaw et al.

(10) Patent No.: US 12,522,391 B2
(45) Date of Patent: Jan. 13, 2026

(54) VACUUM SEALING DEVICE AND METHOD

(71) Applicant: BENNAMANN SERVICES LTD, Newquay (GB)

(72) Inventors: Thomas William Bradshaw, Nr Wantage (GB); Luke James Mann, Truro (GB); Duncan Stuart Glasby, Wadebridge (GB)

(73) Assignee: BENNAMANN SERVICES LTD, Newquay (GB)

( * ) Notice: Subject to any disclaimer, the term of this patent is extended or adjusted under 35 U.S.C. 154(b) by 163 days.

(21) Appl. No.: 18/239,603

(22) Filed: Aug. 29, 2023

(65) Prior Publication Data

US 2024/0076080 A1 Mar. 7, 2024

Related U.S. Application Data

(60) Provisional application No. 63/374,466, filed on Sep. 2, 2022.

(51) Int. Cl.
*B65B 31/04* (2006.01)
*F17C 1/12* (2006.01)

(52) U.S. Cl.
CPC ................ *B65B 31/04* (2013.01); *F17C 1/12* (2013.01)

(58) Field of Classification Search
CPC ........ B65D 81/2015; B65D 53/00; B01J 3/03; B65B 31/04
USPC ......................................... 220/203.04–203.7
See application file for complete search history.

(56) References Cited

U.S. PATENT DOCUMENTS

| | | | | |
|---|---|---|---|---|
| 7,172,089 | B2 * | 2/2007 | Erich | F01P 11/029 220/360 |
| 2012/0085464 | A1 | 4/2012 | Sparschuh | |
| 2014/0124062 | A1 | 5/2014 | Mayr et al. | |
| 2014/0131354 | A1 * | 5/2014 | Chang | B65D 1/40 220/203.07 |
| 2017/0291120 | A1 | 10/2017 | Jackson | |

OTHER PUBLICATIONS

Extended European Search Report issued in Application No. 23194870.4, dated Feb. 7, 2024 (6 pages).

* cited by examiner

*Primary Examiner* — Jason K Niesz

(74) *Attorney, Agent, or Firm* — Rothwell, Figg, Ernst & Manbeck, P.C.

(57) ABSTRACT

Methods and devices for sealing a storage vessel or other apparatus are provided. A piston moves from a first position to a second position within a body to compress a sealing element, such as a metallic ring. One or more attachment elements connect the piston to the body. A removable pipe can be used for pump-out.

23 Claims, 11 Drawing Sheets

100

200

VACUUM SEALING DEVICE AND METHOD

CROSS-REFERENCE TO RELATED APPLICATION

The present application claims the benefit of priority to U.S. Provisional Application Ser. No. 63/374,466, filed on Sep. 2, 2022, which is incorporated herein by reference in its entirety.

FIELD OF THE DISCLOSURE

This disclosure relates generally to the storage of material in vessels, and in particular, the pumping, sealing, and use of vacuum storage vessels.

INTRODUCTION

Various types of materials can be stored in pressurized vessels. This can include, for example, storing cryogenic materials that can be used in numerous applications, including as fuel for an engine. However, the storage of such materials can pose several technical challenges. For instance, in the context of vacuum vessels or insulation cavities that are required to maintain vacuum for extended periods of time, effective isolation of the system can be difficult and expensive.

Accordingly, there remains a need for improved sealing devices and techniques.

SUMMARY

According to embodiments a sealing device is provided that comprises a body having a cavity; a piston; and one or more attachment elements that connect the piston to the body. In some embodiments, the piston is arranged within the body, the piston is movable within the cavity of the body (e.g., to seal a storage vessel when moved from a first position to a second position within the cavity), and/or the attachment elements align and/or restrain the piston within the body (e.g., within the cavity). The device may also comprise one or more sealing elements, such as a primary sealing element that engages with the piston.

According to embodiments, a system is provided that comprises a storage vessel and a sealing device, where the sealing device comprises a body and piston.

According to embodiments, a method is provided that comprises sealing a storage vessel with a sealing device. This may comprise, for example, attaching the sealing device to the storage vessel and pumping out the storage vessel. In certain aspects, sealing the vessel comprises lowering a piston and compressing a sealing element of the sealing device.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification. In the drawings, like reference numbers indicate identical or functionally similar elements.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

BRIEF DESCRIPTION OF THE DRAWINGS

The accompanying drawings, which are incorporated herein and form part of the specification, illustrate various embodiments of the subject matter of this disclosure.

DETAILED DESCRIPTION

According to embodiments, a sealing device is attached to a pipe or vessel, such as a vacuum vessel. In certain aspects, the sealing device has a piston and a metal sealing element, where the piston is initially in a withdrawn state. According to some embodiments, there are small features on the piston and/or the body of the device, which deform the metal sealing element and provide a seal, such as a vacuum seal, when the piston is moved into an engaged state. The device may also include a pump-out port, such that a vacuum vessel can be evacuated through the removable pump out port. When the desired vacuum level is reached, the piston is lowered onto the metal seal using, for instance, jacking screws located between compression joint fittings or a plate over threaded holes. In some embodiments, the piston may be rotated slightly so that the screws are not bearing on the threaded holes. In certain aspects, compression bolts are then used to compress the sealing element and form a leak-tight joint. The removable pump out port can then be disconnected from the assembly. In some embodiments, a burst disc may optionally be included in the center of the piston. In the event of failure of the burst disc, the system can be re-vacuumed and the burst disc replaced.

Figure 1A:
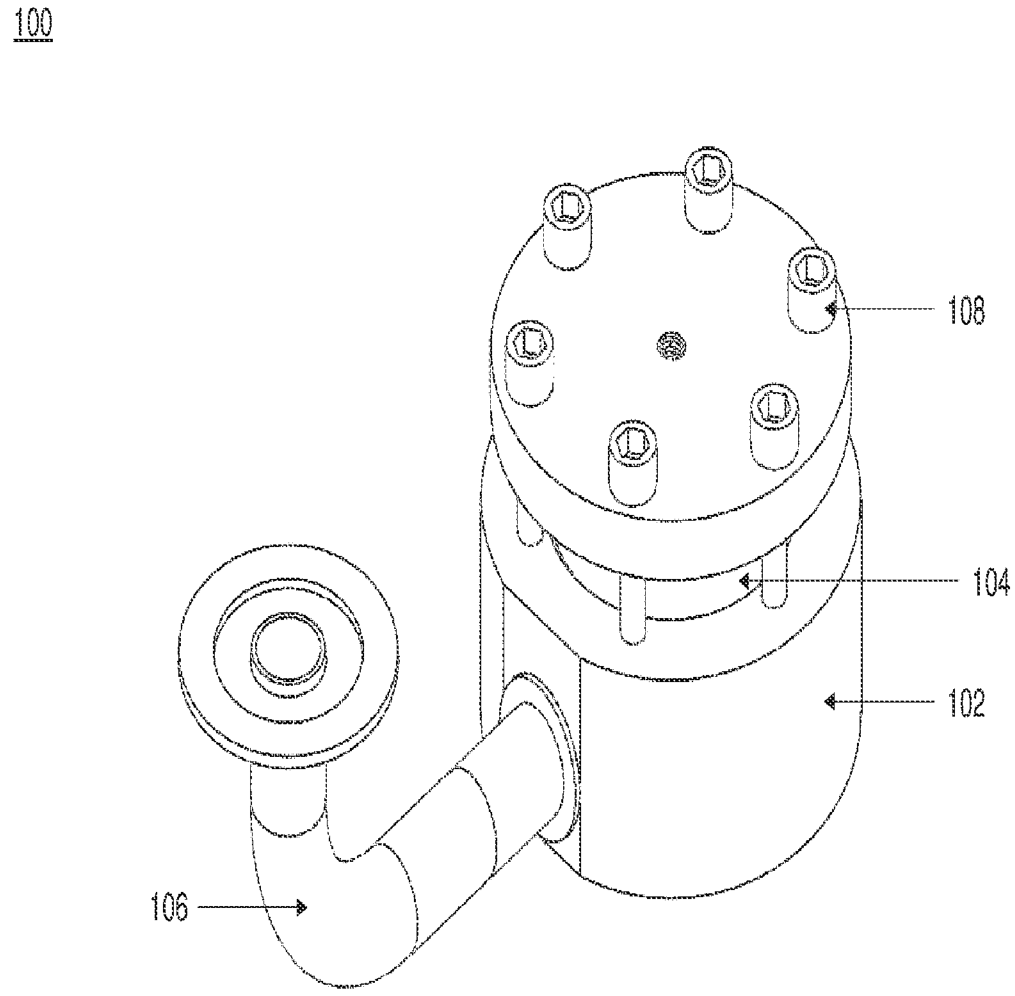
FIGS. 1A-1F illustrate a sealing device according to some embodiments.

Referring now to FIG. 1A, a sealing device 100 is illustrated according to some embodiments. The device 100 may be used, for instance, to seal a vessel, such as a vacuum storage vessel or other pressure vessel. This may include, for instance, sealing vacuum insulation of the vessel. However, the device may be used for other applications. For example, in some embodiments, the device 100 may be used more generally to cover and seal one or more valves (or other features), or may be used in place of one or more valves. In the example of FIG. 1A, the device 100 comprises a body 102 and piston 104. The body 102 and piston 104 may be connected by one or more attachment elements 108. According to embodiments, the attachment elements comprise one or more jacking screws and/or compression bolts (e.g., exposed at a top surface of the piston). Additionally, and as illustrated, there may be a plurality of attachment elements (e.g., three or more, and five in this example). In some embodiments, the plurality of attachment elements are arranged radially about the piston. Other arrangements may be used, for instance, where the piston is non-cylindrical in shape.

As shown in FIG. 1A, the piston 104 is arranged within the body 102. For instance, the piston 104 may be moveable within a cavity of the body. This can enable the device 100 to seal a storage vessel or other component when moved from a first position (open) to a second position (closed)

within the cavity. In certain aspects, the attachment elements 108 align and/or restrain the piston 104 within the body 102. A pipe 106, such as a removable pipe, may also be included. For instance, a pipe 106 may engage with one or more ports of the device 100. In this example, the device 100 has a generally cylindrical shape, where the piston 104 is cylindrical. The body 102 may also be cylindrical and/or a cavity of the body 102 may be cylindrical. However, according to embodiments, other shapes may be used for the device 100, such as squares/rectangles or rounded squares/rectangles. Likewise, the vessel being sealed may have various shapes.

Figure 1B:
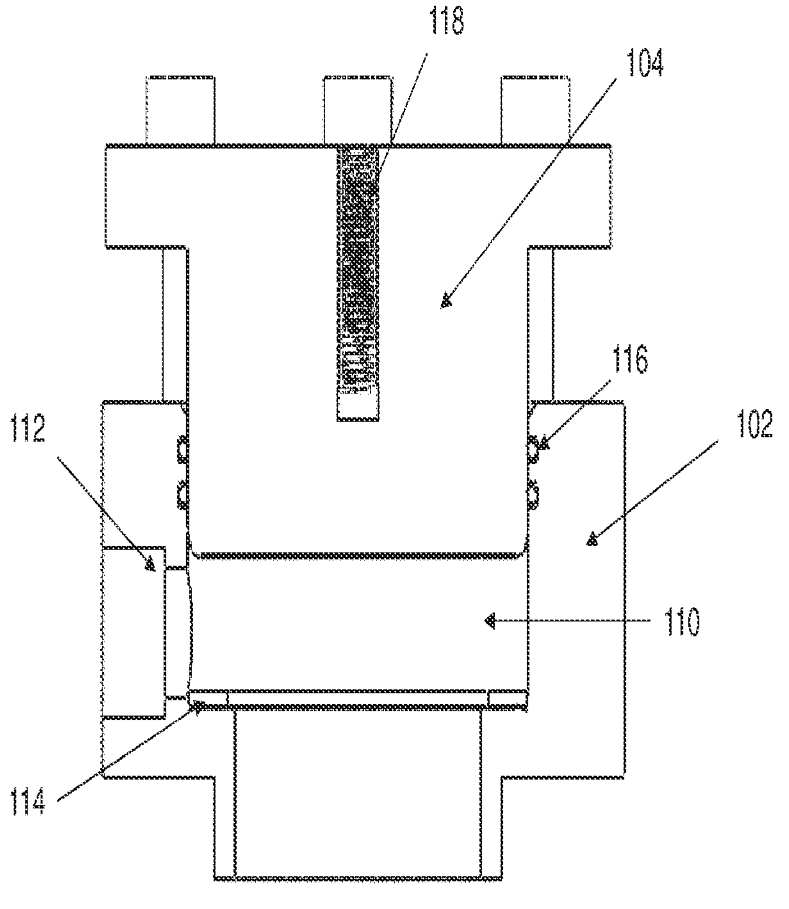

A cross-sectional view of the device 100 is shown in FIG. 1B. In this view, the cavity 110 of the body 102 is shown, with the piston 104 located therein. Additionally, and according to embodiments, there is a primary sealing element 114. The primary sealing element 114 can provide an interface between the body and piston. In this example, the piston is moveably arranged within the cavity of the body to form a seal with the primary sealing element 114 when the piston moves from a first unsealed position to a second sealed position. This may be accomplished when the piston compresses the primary sealing element 114. The primary sealing element 114 may be, for example, annular. Other shapes may be used. In some embodiments, the primary sealing element 114 is comprised of a deformable metal, for instance, made from a soft annealed metal such as oxygen-free copper or aluminum. However, other materials may be used. In the sealed position, the piston can seal off one or more ports 112. The port 112 may be, for example, a pump-out port or an input and/or output port for the sealing device 100 (or a vessel attached thereto). According to embodiments, the port 112 is provided in the body of the device 100 to provide gas or fluid access into the cavity region 100 or a vessel (or other structure) connected to the device 100.

In addition to the primary sealing element, one or more secondary sealing elements 116, 130 may also be used according to some embodiments. The secondary sealing elements 116, 130 may be, for example, O-rings. As shown in FIG. 1B, the secondary sealing elements 116 can provide a seal between the piston and body of the device 100. A more detailed view of the secondary sealing elements 130 is shown in FIG. 1F, where the elements 130 are used to engage the removable pipe, or otherwise restrain or seal the pipe, within the port 112. Though not shown in this figure, a burst disc may optionally be included, for instance, within the piston element 104.

Figure 2A:
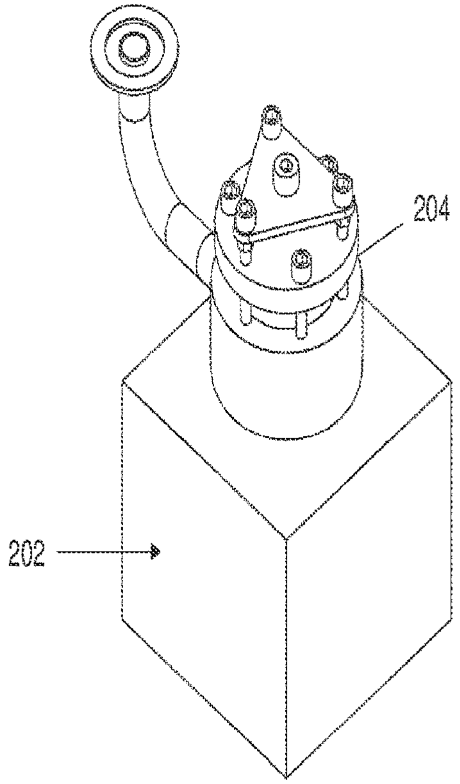
FIGS. 2A-2D illustrate a storage system according to some embodiments.

In some embodiments, a connection point 118 may be used. In this example, the connection point 118 comprises a threaded opening. However, other connection mechanisms may be used according to embodiments, including other physical locking structures. Further aspects of the connection point 118 and its use are described with respect to FIGS. 2A-2C. The connection point 118 may be utilized when raising or lowering the piston according to some embodiments.

Figure 1C:
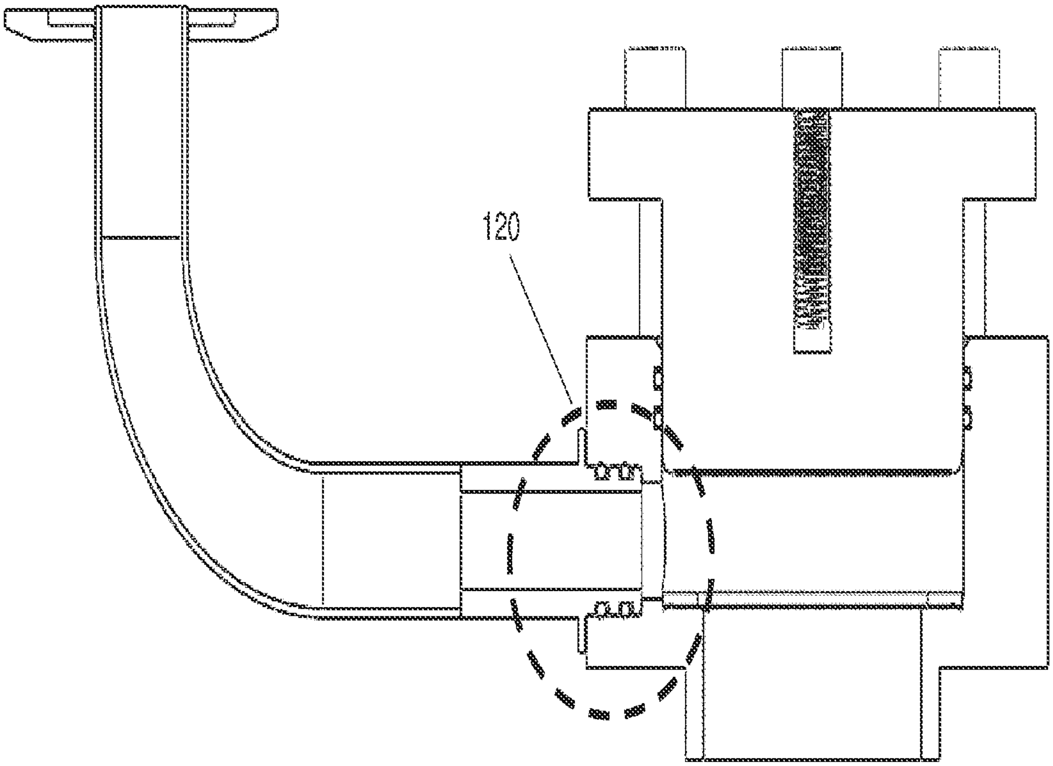
Figure 1D:
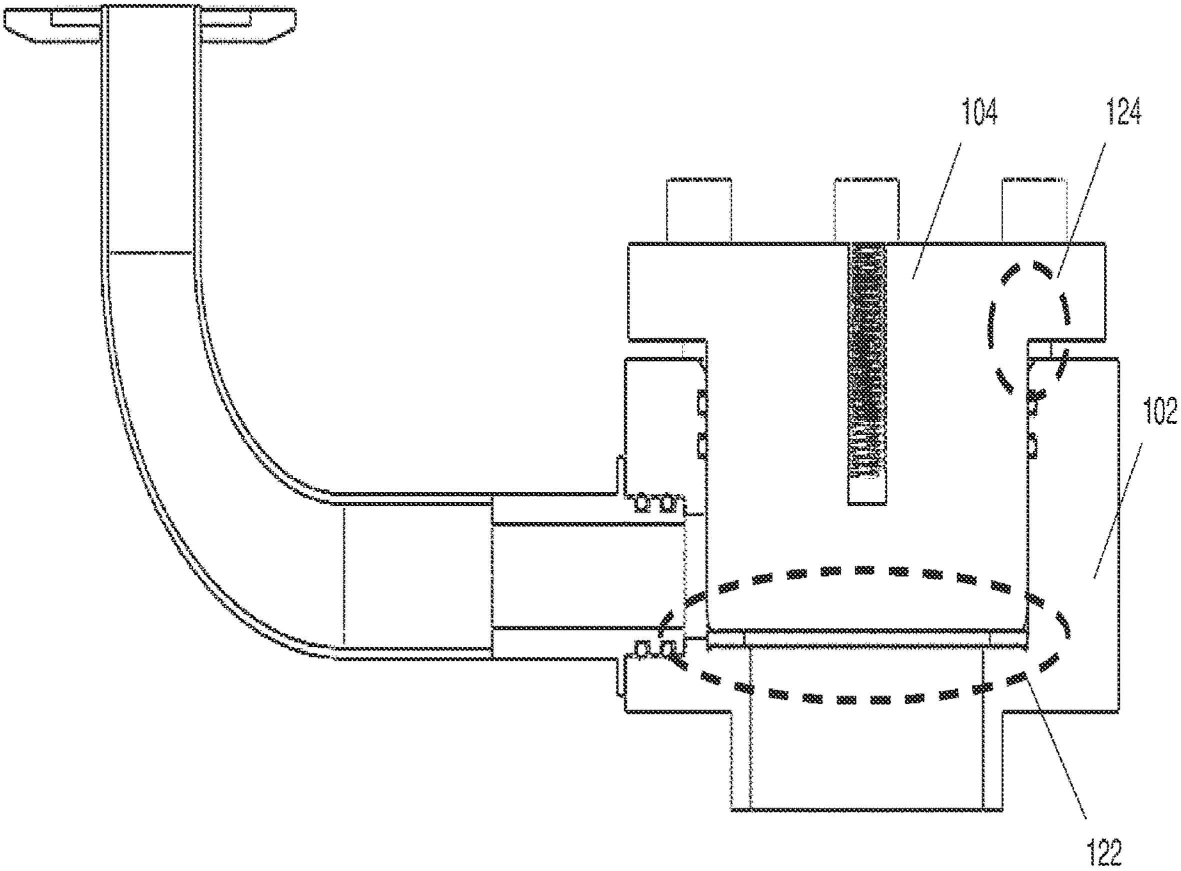
Figure 1E:
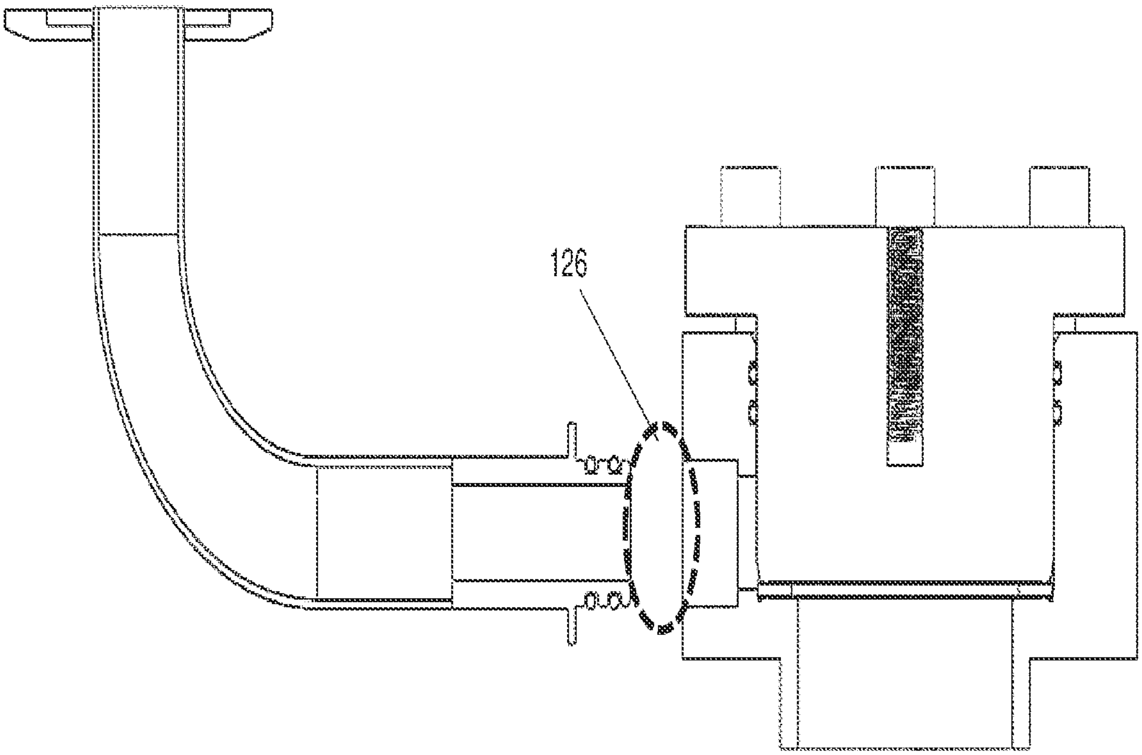
Figure 1F:
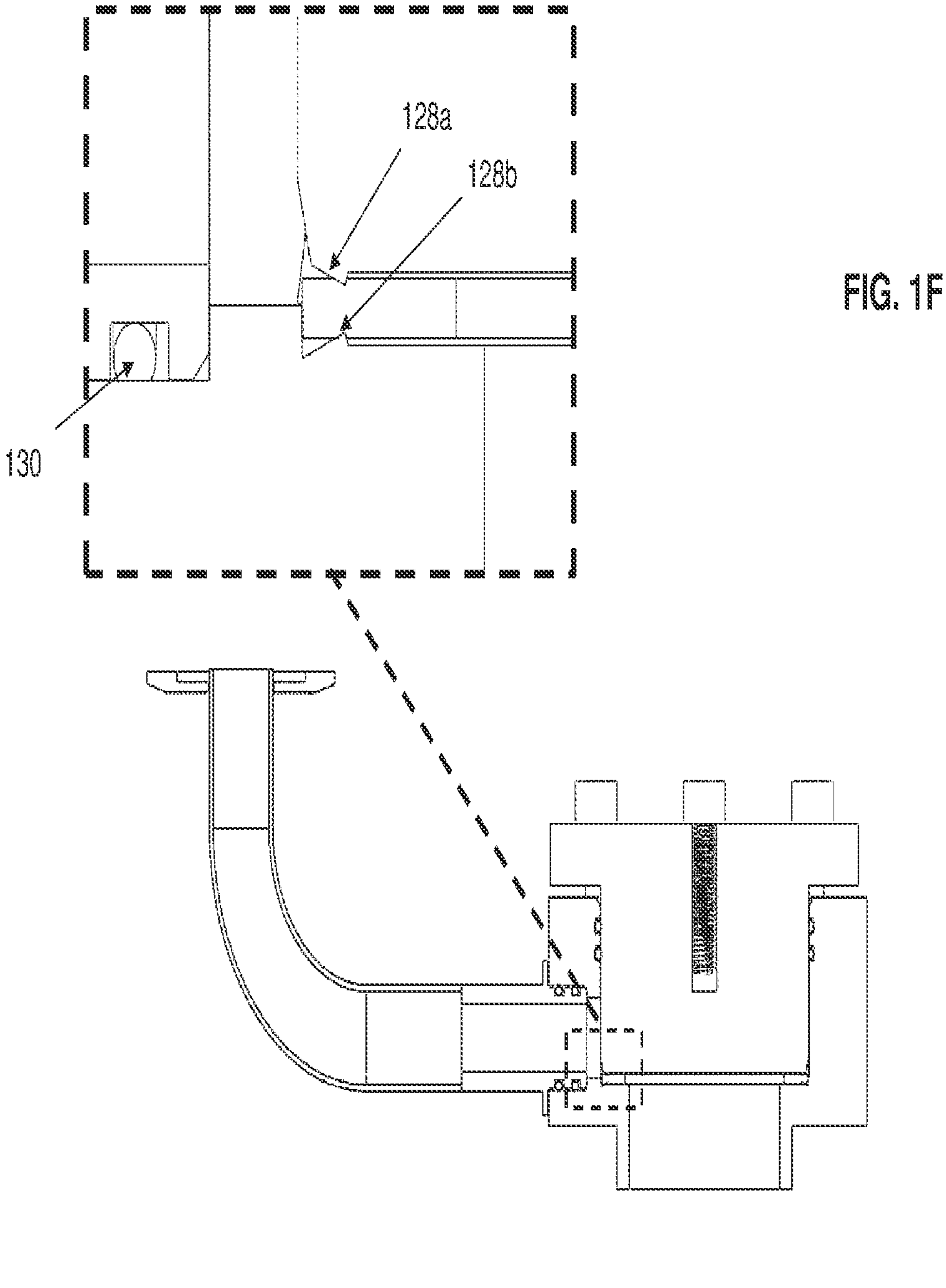

Referring now to FIGS. 1C-1E, aspects of the operation of the sealing device 100 are illustrated. In FIG. 1C, a pipe, such as pipe 106, is engaged 120 in a port, such as port 112. This can be used, for example, for pumping out a vessel attached to the sealing device 100. As shown in FIG. 1D, the piston 104 can be moved to an engaged state 122 such that it forms a seal 122 with the body 102, for instance, by engaging a sealing element such as primary sealing element 114 (e.g., an annular ring of metal in this example). This may be, for example, after pumping out one or more insulation cavities of the vessel. According to embodiments, the movement of the piston 104 in body 102 can be assisted or controlled 124 by one or more attachment elements 108, such as jacking screws and/or compression bolts. The seal may be further enhanced by tightening one or more bolts to press the piston 104 into the sealing element, for instance, as described in connection with FIGS. 1F and 2A-2D. For example, a seal may be created by engaging the piston 104 on the sealing element and increasing the pressure through the use of one or more bolts 108 or other compression devices. As illustrated in FIG. 1E, once sealed, the pipe can be removed 126.

Referring now to FIG. 1F, and according to embodiments, a seal can be improved through the use of one or more protrusions 128. In some embodiments, the protrusions are angled, teeth-like structures. Other shapes may be used. The protrusions may be included on the piston (protrusions 128*a*), on the body (protrusions 128*b*), or both. In certain aspects, the protrusions 128 engage (e.g., touch, crush, crimp, or otherwise deform) a sealing element (e.g., to form a vacuum seal), such as primary sealing element 114. In some embodiments, the piston comprises at least one of the protrusions on a bottom surface thereof (e.g., a plurality of protrusions arranged radially) and the body comprises at least one of the protrusions on a cavity surface (e.g., a plurality of protrusions arranged radially). In some embodiments, the protrusions of the piston and body are aligned. They may be made from the same material as the piston or body (e.g., a part of the piston or body), or they may be attachments thereto.

Figure 2B:
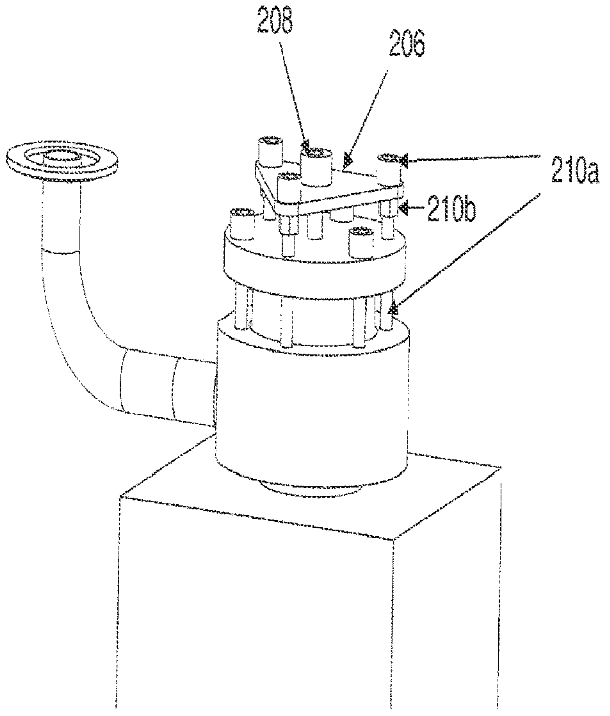
Figure 2C:
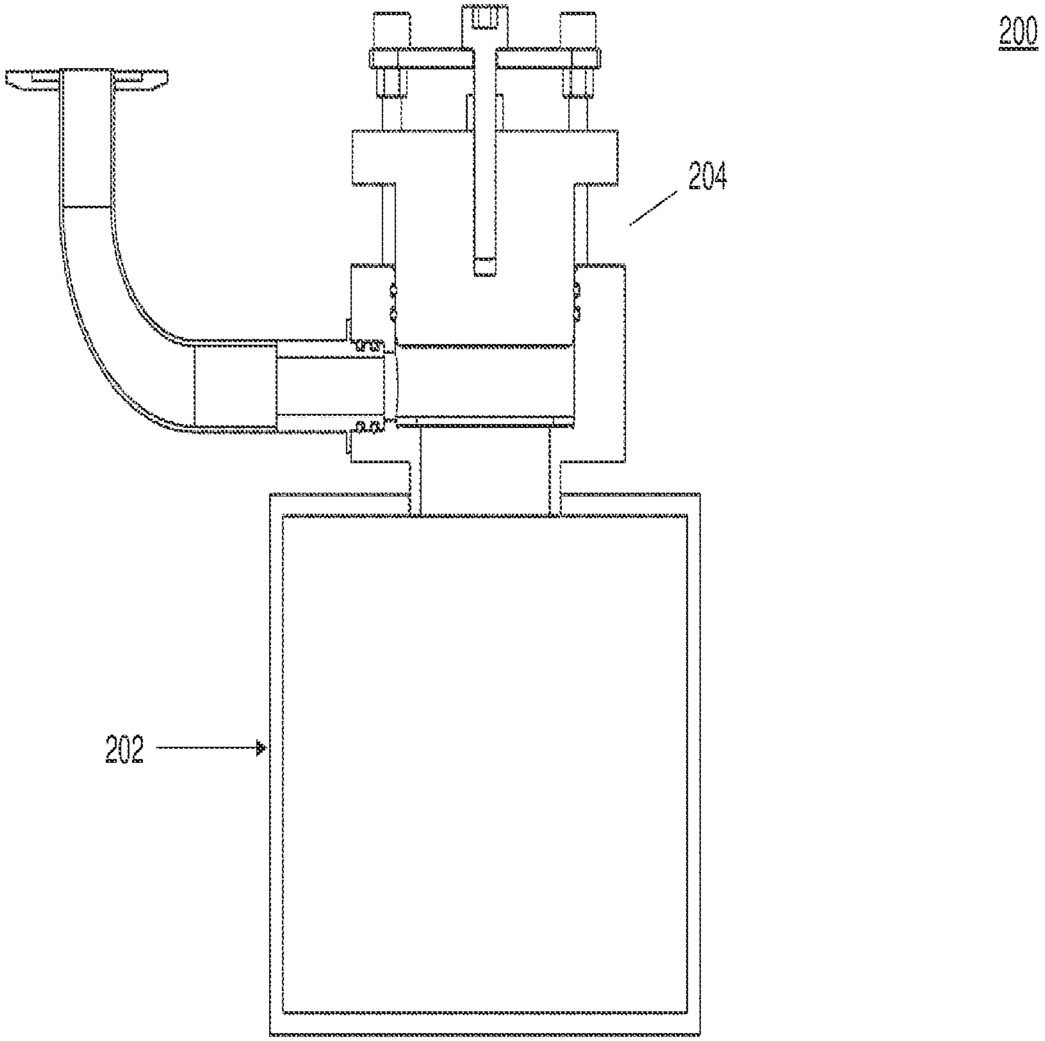
Figure 2D:
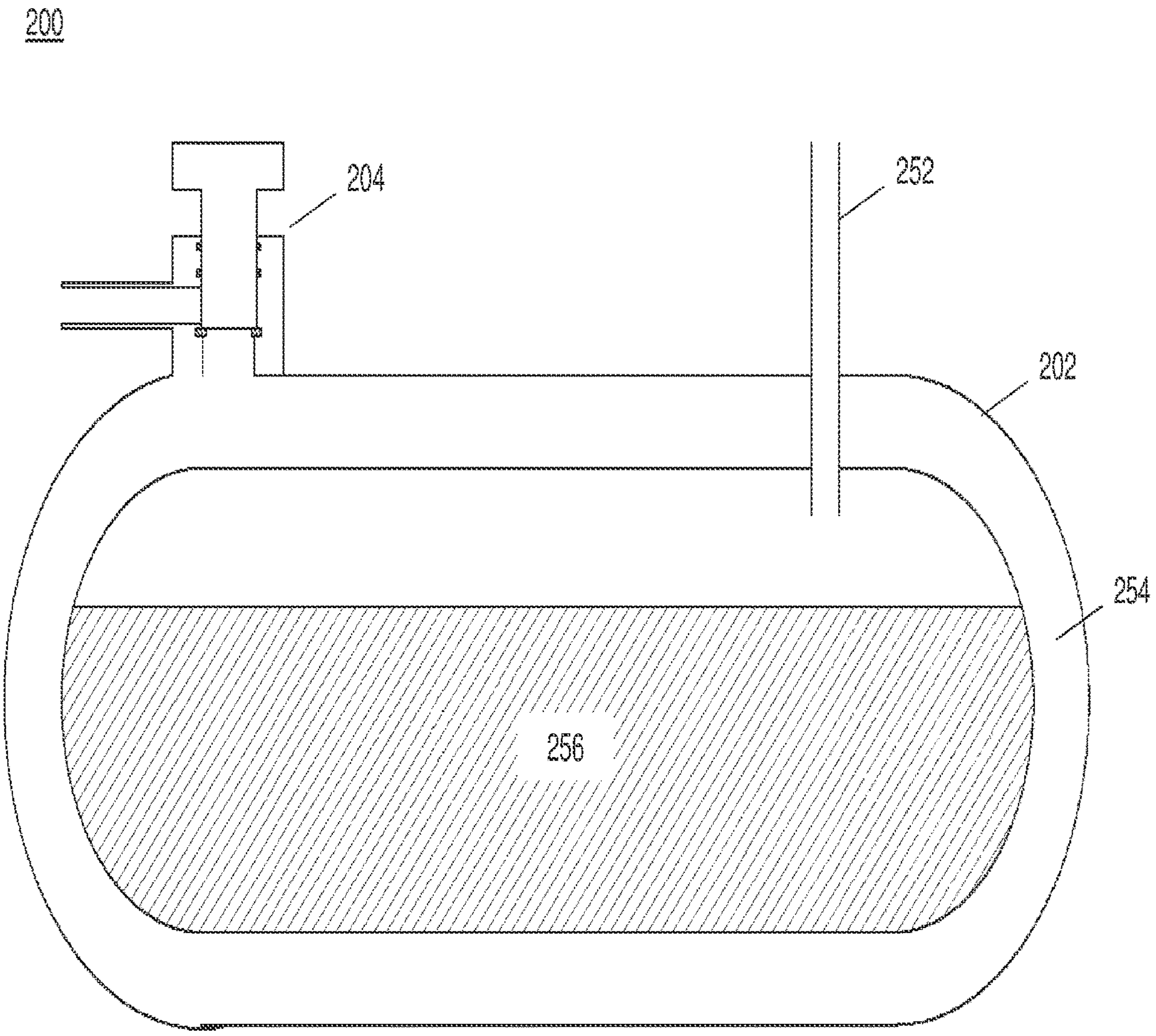

Referring now to FIGS. 2A-2D, a storage system 200 is described according to some embodiments. FIG. 2C is a cross-sectional view of the system 200 shown in FIGS. 2A and 2B. FIG. 2D illustrates another example of the system 200 with vacuum insulation and a fill port illustrated according to some embodiments.

As shown in FIGS. 2A-2D, the system 200 comprises a storage vessel 202 and a sealing device 204. According to embodiments, the sealing device 204 has a body and piston. For example, sealing device 204 may be one or more of the sealing device embodiments described with respect to FIGS. 1A-1F. While element 202 is illustrated as a storage vessel, other apparatuses may be sealed by device 204, including a pipe or other conduit. The device 204 may cover and seal one or more valves, and in certain aspects, may function itself as a valve and used for flow control (e.g., of a fluid or gas). Depending on the vessel 202, the sealing device 204 may be used on different features, including an input, output, vacuum cavity, or pipe of the vessel 202. In some embodiments, the sealing device 204 is welded to an opening of the storage vessel 202, which may be under vacuum in some cases. For instance, the storage device 202 may be adapted for the storage of cryogenic materials (e.g., methane or nitrogen in liquid or gaseous form).

Referring now to FIG. 2B, the sealing device 204 may comprise a support plate 206 in some embodiments. While illustrated as having a triangular shape, the support plate 206 may have other configurations, including other non-circular or non-rectangular shapes. In this example, the support plate 206 is arranged above the piston. This may be accomplished, for instance, using one or more support or dropping elements 210*a*, 210*b*, such as bolts and nuts. In some embodiments, the plate overlaps some—but not all—of the upper surface of the piston. For example, there may be approximately 50% overlap, or there may be no more than 50% overlap. This can leave one or more attachment elements exposed for operation. As illustrated in FIG. 2B, the plate can be attached to and/or support the piston of the sealing device 204. Attachment and/or support may be provided at a connection point of the sealing device 204, such as a connection point 118 as shown in FIG. 1B, in conjunction with a fastening element 208. According to embodiments, the fastening element 208 is engaged with threads of the connection point. In one example, a bolt (e.g., with nut) or other fastening element 208 is loosened or removed to drop the piston. The support or dropping elements 210*a*, 210*b*, hold the plate 206 in place above the system. In some embodiments, element 210*a* is a bolt or similar feature that extends from the plate 206 to the body of the device to help suspend the plate, and thus, the piston. In some embodiments, the suspension elements, such as bolts, are longer than those used to compress a metal seal. The additional attachment elements, such as attachment elements 108 shown in FIG. 1A, can further help to keep the piston in-line (e.g., aligned with the body of a sealing device) during movement.

In some embodiments, in order to drop the piston onto the seal, the fastening element 208 is adjusted. In certain aspects, the nuts 210*b* may be for retention only, and the connection element 208 works to stop the piston from moving (e.g., slamming down) due to vacuum. However, in some embodiments, nuts 210*b* may also be adjusted for dropping the piston. It may be important, in some instances, to lower the piston down on to the seal in a controlled fashion so that the seals (e.g., elastomer seals) working on the piston are not badly deformed. In some embodiments, the seals (e.g., secondary sealing elements 116) are well greased.

Referring now to FIG. 2D, a system 200 is illustrated according to some embodiments. In this example, the sealing device 204 is attached to a vessel 202 that has a vacuum insulation 254 and one or more ports 252. In certain aspects, the sealing device 204 is for sealing the vacuum insulation portion of the vessel, and pumping out the vessel 202 comprises pumping out the vacuum insulation 254. The port 252 may be, in some embodiments, a fill or extraction port for a liquid or gaseous material 256 stored in the vessel 202. This could include a port for cryogenic materials and storage, such as methane, hydrogen, liquid nitrogen, or carbon dioxide ($CO_2$), as examples.

In some embodiments, the sealing devices and techniques described herein are used for the storage of cryogenic materials or other applications that may require insulation to prevent and reduce boil off. Accordingly, a system 200 may use vacuum insulation, and in some instance, further use vacuum together with one or more physical insulation layers. In certain aspects, the vacuum insulation reduces the heat ingress through conduction, and a multi-layer physical insulation through radiation. In some embodiments, the vacuum insulation cavity 254 (or in other implementations, a storage region of a vessel 202 for the material 256) is pumped to vacuum. In some embodiments, it is a high vacuum, such as better than 10-5 mbar.

In some embodiments, a system 200 (or device 204) is used that is free from porous elastomers and seals. Instead, metal or certain non-porous materials are used in these embodiments, optionally in conjunction with welding.

Figure 3:
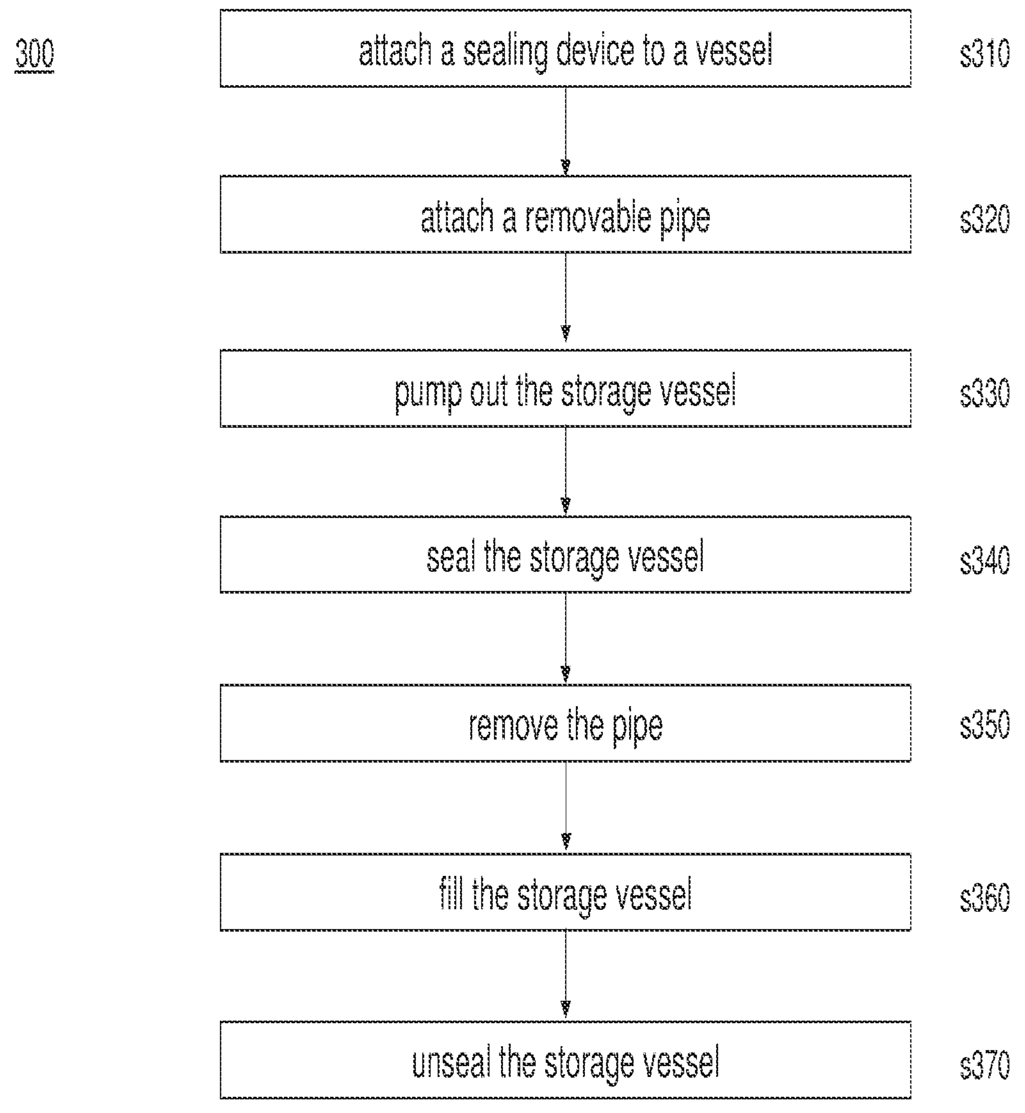
FIG. 3 is a flow diagram illustrating a method according to some embodiments.

Referring now to FIG. 3, a process 300 is illustrated according to some embodiments. The process may begin, for instance, with step s310 in which a sealing device is attached to a storage vessel, pipe, or of container. The sealing device may be, for example, a device 100 as described with respect to FIGS. 1A-1F or a device 204 as described with respect to FIGS. 2A-2D. When the sealing device is attached, it can form a system as shown in FIGS. 2A-2D. Although the process may begin with step s310, in some embodiments, process 300 may begin with a system in which the sealing device is already attached. In step s320, a removable pipe is attached. In some embodiments, this step may be optional (e.g., where the sealing device already has a pipe attached thereto). In step s330, the vessel is pumped out. This may be, for instance, via the pipe attached in step s330. In some embodiments, pumping out the vessel comprises pumping out a vacuum space of the vessel, such as an insulation cavity. In step s340, the storage vessel (or other apparatus) is sealed. This may include, for example, compressing a sealing element of the sealing device to seal the vessel. According to embodiments, a piston is moved from a first (open) position to a second (closed) position within a body of the sealing device to form the seal. In step s350, the pipe can be removed. In step s360, the storage vessel can be filled. In some embodiments, this step is optional, and the process of 300 may be applied to any high-vacuum system. In step s370, the vessel (including a portion of the vessel) may be unsealed. This can include, for example, raising the piston of the sealing device.

Figure 4:
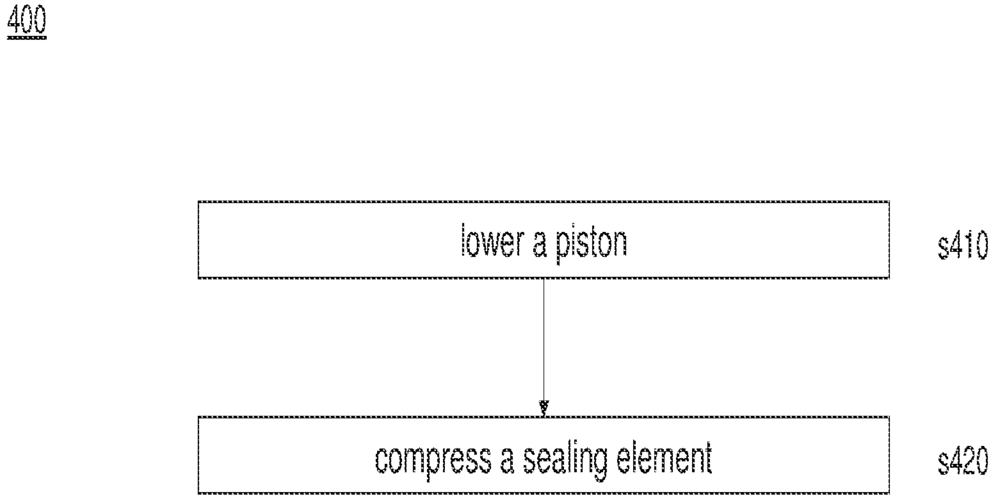
FIG. 4 is a flow diagram illustrating a method according to some embodiments.

Referring now to FIG. 4, a process 400 for sealing is provided according to some embodiments. The process 400 may be used, for example, as part of step s340 in process 300. According to embodiments, process 400 may be used to seal the devices and systems shown in FIGS. 1A-1F and 2A-2D. The process 400 may begin, for instance, by lowering a piston in step s410. In step s420, the sealing element is compressed. In some embodiments, sealing may require additional pressure. For instance, the vacuum that is created via pumping and the pressure exerted by the atmosphere may be insufficient to form a complete seal. To increase the pressure, after a piston is in position against a seal, such a piston 104 against primary sealing element 114, the piston can be tightened to compress the seal. In some embodiments, this can comprise one or more of: (i) removing bolts 210, plate 206, and fastening element 208; (ii) replacing the bolt(s) 210 with shorter bolts; (iii) or mechanically tightening one or more of the attachment elements 108. In some embodiments, the sealing, such as in step s340, s410, or s420, can be improved through the use of one or more protrusions 128 as described with respect to FIG. 1F. In certain aspects, the protrusions 128 engage (e.g., touch, crush, crimp, or otherwise deform) a sealing element (e.g., to form a vacuum seal), such as primary sealing element 114 during a sealing step.

Benefits of some embodiments may include the ability to hold a high vacuum for long periods of time without the need for continuous pumping, thereby reducing costs and simplifying implementation. Costs may also be reduced through the use of inexpensive or otherwise readily available materials. Additionally, the arrangement of some embodiments may enable higher throughputs than conventional designs. Moreover, in certain aspects, the devices and techniques described herein may be implemented without additional vacuum ports to accommodate, for instance, additional seals or burst discs. Space-savings associated with the design of some embodiments can allow for additional beneficial components, such as electrical or fluid feedthroughs. For safety reasons, vacuum vessels are often fitted with a burst disc, particularly cryogenic storage systems that use the vacuum as insulation. These would normally require their own vacuum port. A feature of some embodiments is that a burst disc can be incorporated in the device (e.g., in the piston) without the requirement of an additional vacuum port.

According to some embodiments, the final seal of a vacuum system can be made using a metal seal. The seal can be broken for re-pumping, if required, and is a cost-effective alternative to conventional solutions.

Summary of Embodiments

A1. A sealing device (100), comprising: a body (102) having a cavity (110); a piston (104); and one or more attachment elements (108), wherein the attachment elements connect the piston to the body.

A2. The device of A1, wherein: (i) the piston is arranged within the body; (ii) the piston is movable within the cavity of the body (e.g., to seal a storage vessel when moved from a first position to a second position within the cavity); and/or (iii) the attachment elements align and/or restrain the piston within the body (e.g., within the cavity).

A3. The device of A1 or A2, further comprising: a primary sealing element (114).

A4. The device of A3, wherein: (i) the primary sealing element is a ring; (ii) the primary sealing element is comprised of deformable metal (e.g., made from soft annealed metal, such as oxygen-free copper or aluminium); (iii) the primary sealing element is arranged between the body and piston; and/or (iv) the piston is moveably arranged within the cavity of the body to form a seal with the primary sealing element (e.g., when the piston moves from a first unsealed position to a second sealed position and compresses these primary sealing element).

A5. The device of any of A1-A4, wherein one or more of the piston and body comprise at least one protrusion (128) (e.g., angled, teeth-like structures) to engage (e.g., crush, crimp, or otherwise deform) the primary sealing element (e.g., to form a vacuum seal).

A6. The device of A5, wherein the piston comprises at least one of said protrusions on a bottom surface thereof (e.g., a plurality of protrusions arranged radially) and the body comprises at least one of said protrusions on a cavity surface (e.g., a plurality of protrusions arranged radially).

A7. The device of A6, wherein the protrusions of the piston and body are aligned.

A8. The device of any of A1-A7, further comprising: a port (112) (e.g., a pump-out port or input/out port) in the body of the device (e.g., providing gas/fluid access to the cavity region).

A9. The device of any of A1-A8, further comprising: a pipe (106).

A10. The device of A9, wherein the pipe is a removable pipe configured to engage with the port.

The device of any of A1-A10, further comprising: one or more secondary sealing elements (116, 130).

A12. The device of A11, wherein: (i) the secondary sealing elements (116) comprise one or more O-rings (or other sealing elements) between the piston and body; and/or (ii) the secondary sealing elements (130) comprise one or more O-rings (or other sealing elements) used to attach the removable pipe to the port or restrain the pipe within the port.

A13. The device of any of A1-A12, wherein the attachment elements comprise one or more jacking screws and/or compression bolts (e.g., exposed at a top surface of the piston).

A14. The device of any of A1-A13, wherein the one or more attachment elements comprise a plurality of attachment elements (e.g., three or more).

A15. The device of A14, wherein the plurality of attachment elements are arranged radially about the piston.

A16. The device of any of A1-A15, wherein the device has a generally cylindrical shape (e.g., both the piston and cavity are cylindrical).

A17. The device of any of A1-A16, further comprising: a burst disc (e.g., within the piston).

A18. The device of any of A1-A17, further comprising: a connection point (118).

A19. The device of A18, wherein the connection point comprises a threaded opening.

A20. The device of any of A1-19, further comprising: a support plate (206) (e.g., having a triangular or other non-circular or non-rectangular shape).

A21. The device of A20, wherein the plate is arranged above the piston (e.g., using one or more support or dropping bolts/nuts (**210*a*/210*b***)).

A22. The device of A21, wherein the plate is attached to the piston (and/or supports the piston) using the connection point (e.g., via a fastening element (208) or screw engaged in the threads of the connection point).

A23. The device of any of A20-A22, wherein the plate overlaps some, but not all (e.g., 50%), of the upper surface of the piston (e.g., to leave one or more attachment elements exposed).

B1. A storage system (200), comprising: a storage vessel (202); and a sealing device (204), wherein the sealing device comprises a body and piston.

B2. The storage system of B 1, wherein the sealing device is a sealing device according to any of A1-A23.

B3. The storage system of B1 or B2, wherein the sealing device is welded to the storage vessel.

B4. The storage system of any of B1-B2, wherein the vessel is under vacuum.

B5. The storage system of any of B1-B4, wherein the storage device is adapted for the storage of cryogenic materials (e.g., methane or nitrogen in liquid or gaseous form).

B6. The storage system of any of B1-B5, wherein the sealing device seals vacuum insulation, an input, an output, or a pipe of the storage vessel.

B7. The storage system of any of B1-B6, wherein the sealing device functions as a valve (e.g., for the storage vessel).

B8. The storage system of any of B1-B7, wherein the storage vessel comprises vacuum insulation (254) and the sealing device is attached to the vacuum insulation.

B9. The storage system of any of B1-B8, wherein the storage vessel comprises one or more of physical insulation (e.g., multi-layer insulation) and a fill and/or extraction port (252).

C1. A method (300), comprising: sealing (340, 400) a storage vessel with a sealing device according to any of A1-A23.

C2. The method of C1, further comprising one or more of: attaching (310) the sealing device to the storage vessel; and pumping (330) out the storage vessel.

C3. The method of C1 or C2, further comprising: filling (360) the storage vessel (e.g., with a material for cryogenic storage via a port).

C4. The method of any of C1-C3, wherein the storage vessel is pumped out using a removable pipe, further comprising: after sealing the storage vessel, removing (350) the pipe.

C5. The method of any of C1-C4, further comprising: unsealing (370) the storage vessel.

C6. The method of any of C1-C5, wherein sealing comprises: lowering (410) the piston within a cavity of the body.

C7. The method of any of C1-C6, wherein sealing comprises: compressing (420) a sealing element of the sealing device.

C8. The method of any of C1-C7, wherein the sealing device comprises a primary sealing element (e.g., metal ring) arranged between the piston and body, and wherein sealing the storage vessel comprises engaging/compressing the sealing element with the piston (e.g., crushing, crimping, or otherwise deforming) to seal the storage vessel.

C9. The method of C8, wherein the sealing element is engaged/compressed with one or more protrusions (e.g., teeth) of the piston and/or body.

C10. The method of any of C6-C9, wherein the piston is lowered (and/or the sealing element is engaged/compressed) using one or more attachment elements of the sealing device (e.g., jacking screws and compression bolts).

C11. The method of any of C6-C10, wherein the piston is lowered (and/or the sealing element is engaged) by loosening (e.g., removing) a dropping bolt (or similar element) between a plate and a connection point of the piston (e.g., a threaded opening).

C12. The method of any of C2-C11, wherein pumping out the storage vessel comprises pumping out a vacuum insulation cavity of the vessel.

D1. Performing the method of any of C1-C12 on a device or system of any of A1-A23 and B1-B9.

E1. Using a device or system according to any of A1-A23 or B1-B9 to store and/or transport cryogenic materials in gaseous or liquid form (e.g., methane or nitrogen).

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A sealing device, comprising:
a body having a cavity;
a piston; and
a plurality of attachment elements arranged radially about the piston, wherein the attachment elements connect the piston to the body.

2. The device of claim 1, wherein the sealing device is configured to seal a storage vessel when the piston is moved from a first position to a second position within the cavity.

3. The device of claim 1, wherein the attachment elements comprise a plurality of jacking screws or compression bolts exposed at a top surface of the piston.

4. The device of claim 1, further comprising:
a connection point, wherein the connection point comprises a threaded opening; and
a support plate, wherein the support plate is arranged above the piston and is attached to the piston using the connection point.

5. The device of claim 1, wherein the piston is arranged within the body, and the piston is movable within the cavity of the body.

6. The device of claim 5, wherein the attachment elements align or restrain the piston within the body.

7. The device of claim 1, further comprising:
a port in the body of the sealing device configured to provide gas or fluid access to the cavity.

8. The device of claim 7, further comprising:
a pipe, wherein the pipe is a removable pipe configured to engage with the port.

9. A storage system, comprising:
a storage vessel; and
a sealing device according to claim 1.

10. The storage system of claim 9, wherein the sealing device seals vacuum insulation, an input, an output, or a pipe of the storage vessel, or wherein the sealing device functions as a valve for the storage vessel.

11. The device of claim 1, further comprising:
a primary sealing element arranged between the body and piston.

12. The device of claim 11, wherein the primary sealing element is a ring comprised of deformable metal.

13. The device of claim 11, further comprising:
one or more secondary sealing elements, wherein the secondary sealing elements comprise one or more O-rings between the piston and body, or wherein the secondary sealing elements comprise one or more O-rings that attach a removable pipe to a port or restrain a removable pipe within a port.

14. The device of claim 11, wherein one or more of the piston and body comprise at least one protrusion configured to engage the primary sealing element.

15. The device of claim 14, wherein the piston comprises at least one of said protrusions on a bottom surface thereof and the body comprises at least one of said protrusions on a surface of the cavity.

16. A method, comprising:
attaching a sealing device to a storage vessel; and
sealing the storage vessel with the sealing device,
wherein the sealing device comprises a body having a cavity, a piston, and a plurality of attachment elements arranged radially about the piston that connect the piston to the body.

17. The method of claim 16, further comprising:
pumping out the storage vessel using a removable pipe; and
after sealing the storage vessel, removing the pipe.

18. The method of claim 16, wherein sealing comprises:
lowering the piston within the cavity; and
compressing a sealing element of the sealing device.

19. The method of claim 18, wherein:
(i) the piston is lowered or the sealing element is compressed using one or more attachment elements of the sealing device, or
(ii) the piston is lowered or the sealing element is compressed by loosening a dropping bolt between a plate and a connection point of the piston.

20. The method of claim 18, wherein compressing the sealing element comprises deforming the sealing element with one or more protrusions of the piston or body.

21. A sealing device, comprising:
a body having a cavity;
a piston;

one or more attachment elements, wherein the one or more attachment elements connect the piston to the body; and a primary sealing element arranged between the body and piston, wherein each of the piston and body comprise at least one protrusion configured to engage the primary sealing element, and wherein the piston comprises at least one of said protrusions on a bottom surface thereof and the body comprises at least one of said protrusions on a surface of the cavity.

22. A sealing device, comprising:

a body having a cavity;

a piston;

one or more attachment elements, wherein the one or more attachment elements connect the piston to the body; and a primary sealing element arranged between the body and piston, wherein the primary sealing element is a ring comprised of deformable metal.

23. A sealing device, comprising:

a body having a cavity;

a piston;

a connection point in the piston, wherein the connection point comprises a threaded opening; and a support plate, wherein the support plate is arranged above the piston and is attached to the piston using the connection point.

* * * * *